United States Patent
Kaluzhny et al.

(10) Patent No.: US 9,223,960 B1
(45) Date of Patent: Dec. 29, 2015

(54) STATE-MACHINE CLOCK TAMPERING DETECTION

(71) Applicant: WINBOND ELECTRONICS CORPORATION, Zhubei (TW)

(72) Inventors: Uri Kaluzhny, Beit Shemesh (IL); Tsachi Weiser, Even Yehuda (IL); Valery Teper, Petach Tikva (IL); Nir Tasher, Tel Mond (IL)

(73) Assignee: WINBOND ELECTRONICS CORPORATION, Zhubei (TW)

( * ) Notice: Subject to any disclaimer, the term of this patent is extended or adjusted under 35 U.S.C. 154(b) by 0 days.

(21) Appl. No.: 14/447,644

(22) Filed: Jul. 31, 2014

(51) Int. Cl.
  *G06F 21/50*  (2013.01)
  *G06F 11/07*  (2006.01)

(52) U.S. Cl.
  CPC ............ *G06F 21/50* (2013.01); *G06F 11/0721* (2013.01); *G06F 2221/034* (2013.01)

(58) Field of Classification Search
  None
  See application file for complete search history.

(56) References Cited

U.S. PATENT DOCUMENTS

| | | | |
|---|---|---|---|
| 6,009,531 A * | 12/1999 | Selvidge et al. | 713/400 |
| 6,295,300 B1 * | 9/2001 | Oyama | 370/503 |
| 6,393,126 B1 * | 5/2002 | van der Kaay et al. | 380/241 |
| 6,470,458 B1 * | 10/2002 | Dreps et al. | 713/400 |
| 7,149,916 B1 * | 12/2006 | Marino | 713/600 |
| 2003/0081708 A1 * | 5/2003 | Gelke et al. | 375/354 |
| 2003/0115503 A1 * | 6/2003 | Lehman et al. | 714/25 |
| 2008/0307240 A1 * | 12/2008 | Dahan et al. | 713/320 |
| 2009/0040063 A1 * | 2/2009 | Yearsley | 340/693.3 |
| 2011/0221498 A1 * | 9/2011 | Condorelli et al. | 327/162 |
| 2014/0281643 A1 * | 9/2014 | Tiri et al. | 713/340 |
| 2015/0162920 A1 * | 6/2015 | Dobbs et al. | |
| 2015/0178518 A1 * | 6/2015 | Taratine et al. | |

* cited by examiner

*Primary Examiner* — Michael R Vaughan
(74) *Attorney, Agent, or Firm* — Soroker-Agmon

(57) ABSTRACT

An apparatus for detecting tampering with a clock of a state-machine, comprising, a master state-machine having master states and driven by a master clock, the master states being switchable responsive to events, and an auxiliary state-machine having auxiliary states and driven by an auxiliary clock synchronous with the master clock, the auxiliary states being switchable responsive to a signal generated based at least on said events, consequently establishing a correspondence between the master states and the auxiliary states, thus ensuring that subsequent to tampering with the master clock the correspondence between the master states and the auxiliary states become discordant, thereby indicating that the master clock has been tampered with.

7 Claims, 2 Drawing Sheets

STATE-MACHINE CLOCK TAMPERING DETECTION

BACKGROUND

The present disclosure generally relates to state-machines and more specifically to electronically implemented state-machines.

Electronically implemented state-machines are known in the art, including state-machines having multiple clocks or unit. For example, U.S. Pat. No. 4,480,198 that reports a device for increasing the operational security of a duplicated clock, or U.S. Pat. No. 8,229,111 that reports an apparatus using at least two finite state-machine units, or U.S. Pat. No. 5,377,205 that reports an apparatus having multiple state-machines and multiple clocks.

SUMMARY

One exemplary embodiment of the disclosed subject matter is an apparatus for detecting tampering with a clock of a state-machine, comprising, a master state-machine having master states and driven by a master clock, the master states being switchable responsive to events, and an auxiliary state-machine having auxiliary states and driven by an auxiliary clock synchronous with the master clock, the auxiliary states being switchable responsive to a signal generated based at least on said events, consequently establishing a correspondence between the master states and the auxiliary states, thus ensuing that subsequent to tampering with the master clock the correspondence between the master states and the auxiliary states become discordant, thereby indicating that the master clock has been tampered with.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
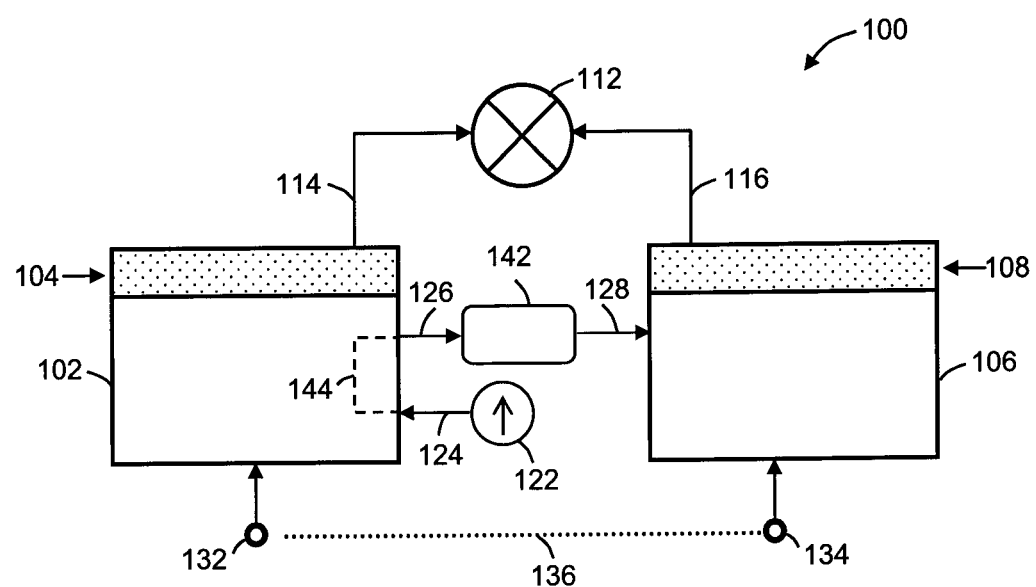

References to previously presented elements are implied without necessarily further citing the drawing or description in which they appear.

Figure 2:
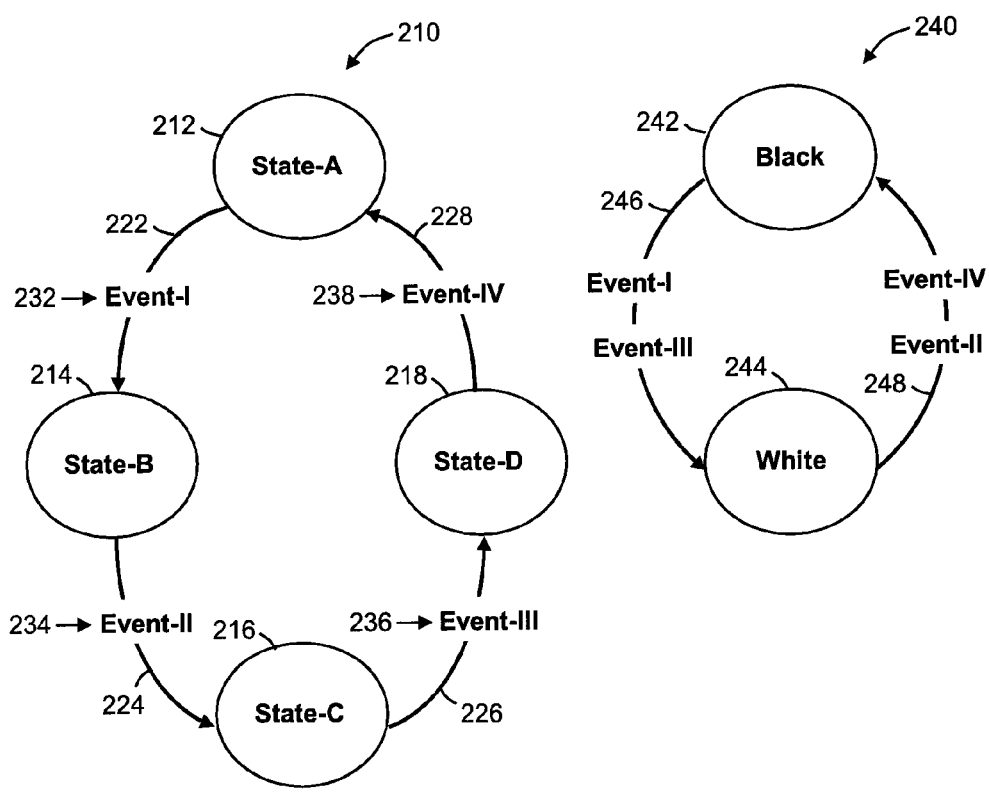

FIG. 1 schematically illustrates an organization of block diagrams and signals for detecting tampering of a clock of a state-machine, according to exemplary embodiments of the disclosed subject matter; and FIG. 2 diagrammatically illustrates states and transitions therebetween of a master state-machine and an auxiliary state-machine responsive to equivalently the same events, according to exemplary embodiments of the disclosed subject matter.

DETAILED DESCRIPTION

In the context of the present disclosure, without limiting, a state-machine implies a state-machine as known in the art such as a device that stores a status or state at a given time and, responsive to occurring conditions or events, changes the status or state and possibly activating other actions.

Generally, in the present disclosure a state-machine is referred to as a device comprising electronic circuitry and components, without precluding emulations and/or simulations thereof.

For brevity and without limiting, a condition or an event or any occurrence that brings about a transition from a state to another one is referred to collectively as an event.

In the context of the present disclosure, a maser state-machine refers to the main or core state-machine operable to carry out a main duty and an auxiliary state-machine refers to a state-machine operable in conjunction with the master state-machine for validating or testing the operation of the master state-machine.

For clarity and brevity, the clock and states of the master state-machine are referred to also as a master clock and master states, respectively. Likewise, the clock and states of the auxiliary state-machine are referred to also as an auxiliary clock and auxiliary states, respectively, and the auxiliary states are referred to also as 'colors'.

In the context of the present disclosure, without limiting, a clock-driven state-machine refers to a state-machine where a state, or a state value, is set or held or strobbed or latched by a clock signal; that is, when an event brings about a transition from a state to a next one, the next state is held by the clock signal until another transition takes place.

In the context of the present disclosure, referring to a synchronous and/or simultaneous operation of one device with another implies practically synchronous or simultaneous operation though not necessarily strictly precisely coinciding, possibly due to factors such as different tolerances of components and/or inherent delays and/or timing variations.

In the context of the present disclosure, tampering with a clock of a state-machine implies disabling or incising the clock conductor or disrupting the clock by any technique of the art, yet unless otherwise stated tampering the clock of a state-machine implies also a malfunction or a failure of the state-machine at least with respect to the clock thereof.

The terms cited above denote also inflections and conjugates thereof.

One technical problem dealt by the disclosed subject matter is detecting tampering with a master clock of a clock-driven master state-machine.

One technical solution according to the disclosed subject matter is adding to the master state-machine an auxiliary state-machine driven by an optionally independent auxiliary clock that is synchronized with the master clock. The auxiliary state-machine is configured to operate in conjunction with the master state-machine and to respond to events of the master state-machine by changing the auxiliary states synchronously with the transitions of the master state-machine. The transitions of the auxiliary state-machine are responsive to an auxiliary signal generated by a logic circuitry that, at least in some embodiments, takes into account the state of the master state-machine.

The master state-machine and the auxiliary state-machine are configured so that the states of the master state-machine and the auxiliary states, or colors, of the auxiliary state-machine correspond to or match each other.

Thus, in case the master clock of the master state-machine is tampered with, the master state-machine remains in the last state before the master clock was tampered with.

The auxiliary clock, however, keeps on running and the auxiliary state-machine is still operative and responds to auxiliary signal, thereby changing colors. Consequently, the correspondence between the last state of the master state-machine and the current color does not hold, thus indicating that a malfunction of the master clock.

In order to detect and alert on the disrupted operation of the master clock, a circuitry designed and configured to validate matching of the master states and the colors, referred to also as a validation circuitry, is linked with or connected to the master state-machine and the auxiliary state-machine. The validation circuitry is aware of and/or accessible to the master states and the colors and identifies a circumstance where a color does not correspond or matches a master state, and, may alert to that effect thus indicating a tampering of the master clock. The alert may be in any suitable form or technique, for example, by a designated electronic signal or an audible signal or a LED light or by triggering an operation and so forth.

Thus, the combination and/or conjunction of the master state-machine with the auxiliary state-machine and the linkage with the validation circuitry provide for detecting and at least optionally notifying tampering with the master clock.

It is noted that, at least generally, while techniques for tampering with a clock of a circuit are known in the art, it is more difficult and complicated to tamper with two clocks and, moreover, an additional clock is not necessarily expected.

It is noted also that the correspondence between the master states and the colors is not necessarily of a one-to-one nature. For example, a one-to-many correspondence where two or more master states map or correspond to one color.

In some embodiments, to further secure the detection of tampering with the master clock, a plurality of auxiliary state-machines may be combined with the master state-machine, so that even if the master clock and an auxiliary clock are tampered with, the additional auxiliary state-machine or auxiliary state-machines and the auxiliary clock or auxiliary clocks are still running and enable detection and notification of the tampering with the master clock as described above.

A potential technical effect of the disclosed subject matter is a straightforward apparatus, avoiding complicated circuitry, for detection and alerting of tampering with or a malfunction of a clock of a state-machine.

A general non-limiting overview of practicing the present disclosure is presented below. The overview outlines exemplary practice of embodiments of the present disclosure, providing a constructive basis for variant and/or alternative and/or divergent embodiments.

FIG. 1 schematically illustrates an organization 100 of block diagrams and signals for detecting tampering of a clock of a state-machine, according to exemplary embodiments of the disclosed subject matter.

A master state-machine 102 having a master state 104 and an auxiliary state-machine 106 having a color 108 as an auxiliary state operate together as described below.

The master state-machine receives events, as an event 122, as illustrated by an arrow 124. Event 122 effects transitions of master state-machine 102 and further, as illustrated schematically by a dashed-line 144, provides master state 104 to a logic circuitry 142 that, base on master state 102 generates an auxiliary signal 128 that is provided to auxiliary state-machine 106. Responsive to auxiliary signal 128 auxiliary state-machine 106 switches color simultaneously with the transition of master state-machine 102.

It is noted that transitions of master state-machine 102 and of auxiliary state-machine 106 do not necessarily changes maser state 104 and/or color 108, respectively. Thus, master state-machine 102 and/or auxiliary state-machine 106 may switch to, or effectively remain at, a current master state 104 and/or color 108, respectively.

It is also noted that, in some embodiments or circumstances, logic circuitry 142 does not take into account master state so that auxiliary signal 128 triggers a transition of auxiliary state-machine 106 irrespective of master state 104.

Master state 104 and color 108 are strobbed or latched or otherwise set by a master clock 132 and an auxiliary clock 134, respectively, where master clock 132 and auxiliary clock 134 are synchronized as indicated schematically by a dotted-line 136. In some embodiments, master clock 132 and auxiliary clock 134 are independent of each other. Alternatively, in some embodiments, master clock 132 and auxiliary clock 134 are driven from the same timing circuitry.

As transitions of master state-machine 102 and auxiliary state-machine 106 are effected simultaneously by event 122 and auxiliary signal 128, respectively, and as master state 104 and color 108 are set by synchronous master clock 132 and auxiliary clock 134, respectively, consequently there is a correspondence or correlation between master state 104 and color 108.

In case master clock 132 becomes inoperative, such as due to tampering and/or fault and/or failure, master state-machine 102 remains in the last master state 104. Yet, auxiliary state-machine 106 with auxiliary clock 134 independently and irrespective to master state-machine 102 operates, responding to event 122. Thus, eventually, the correspondence or correlation between master state 104 and color 108 become discordant or uncorrelated, thereby indicating malfunction of master state-machine 102 at least with respect to master clock 132.

A validation circuitry 112 is constructed to check whether master state 104 and color 108 correspond to each other and, at least optionally, to activate an alert when a miscorrelation or discordant correspondence occurs between master state 104 and color 108. Therefore, validation circuitry 112 is linked to master state-machine 102 and auxiliary state-machine 106 with accessibility to master state 104 and color 108, as indicated by an arrow 114 and an arrow 116, respectively.

Thus, by way of example, supposedly master state 104 is in a 'state-A' and responsively to event 122 should switch to a 'state-B' and, correspondingly, color 108 is in 'green' color and should switch to 'blue' color responsively to event 122.

Thus, in case master clock 132 is tampered with, switching of master state-machine 102 is disrupted and master state 104 of master state-machine 102 stays in 'state-A' while auxiliary state-machine 106 responds to event 122 and color 108 is set by auxiliary clock 134 to 'blue'. Consequently the correlation of master state 104 with color 108 is breached.

As validation circuitry 112 detects or identifies the miscorrelation of master state 104 with color 108, in some embodiments, validation circuitry 112 is configured to activate an action such as generating an alert. For example, turning on a red light, whereas, optionally, when master state 104 with color 108 correspond to each other a green light is on; or, for example, validation circuitry 112 may be constructed to reset master state-machine and/or otherwise affect master state-machine 102 to disable retrieval of data such as confidential data.

In some embodiments, master state 104 and the auxiliary state as color 108 are implemented as known in the art, for example, by an array of flip-flops representing data bits, where the number of elements, or data bits, representing master state 104 and the auxiliary state as color 108 are not necessarily the same.

It is also noted that the correspondence or correlation of master state 104 and color 108 may not be of a one-to-one relation, but, rather, may be at least partly a one-to-many or many-to-one correspondence.

Thus, by way of example, master state 104 as 'state-A' and 'state-B' may correspond to 'blue' color and master state 104 as 'state-C' may correspond to 'green' color.

When master state 104 and color 108 do not correlate to each other in a strict one-to-one correspondence, a plurality of transition of auxiliary state-machine 106 may occur until eventually disruption of master clock is identified by validation circuitry 112.

Synchronization of master clock 132 and auxiliary clock 134 may be carried out by techniques of the art. For example, using separate timing circuitries with equivalent crystals so that master clock 132 and auxiliary clock 134 are independent of each other; or, for example, driving master clock 132 and auxiliary clock 134 from the same timing source.

It is noted that colors are used figuratively for the respective auxiliary state thereof to further clarify the distinction between master state 104 and the auxiliary state.

It is also noted that master state-machine 102 may constitute and operate as part in a larger system or a device, such as a security system controlled by master state-machine 102, so that detecting breaching of master state-machine 102 and reacting by suitable measure, such as disabling master state-machine 102, is thus provided.

In some embodiments, validation circuitry 112 is comprised in master state-machine 102 and/or auxiliary state-machine 106.

In some embodiments, a plurality of auxiliary state-machines as and/or similar to auxiliary state-machine 106 operate responsive to auxiliary signal 128 along with master state-machine 102, so that in case an auxiliary clock or an auxiliary state-machine, as and/or similar to auxiliary clock 134, is also tampered with or is inoperative, the remaining auxiliary state-machines enable detection of malfunction of master state-machine 102 as described above. Likewise, a plurality of logic circuitry 142 may be implemented. Thus, having redundancy of auxiliary state-machine increases the reliability of detecting tampering with master state-machine 102 and/or clock master clock 132 thereof, at least potentially.

FIG. 2 diagrammatically illustrates by way of a simplified example akin to organization 100, states and transitions therebetween of a master state-machine and an auxiliary state-machine responsive to equivalently the same events, according to exemplary embodiments of the disclosed subject matter.

Diagram 210 illustrates four master states and transitions of a maser state-machine responsive to events. The master states are represented by a 'State-A', denoted as a state 212, a 'State-B', denoted as a state 214, a 'State-C', denoted as a state 216 and a 'State-D' denoted as a state 218.

Responsive to events akin to event 122, the master states switch therebetween. Responsive to Event-I, denoted as event 232, the master state-machine switches from 'State-A' to 'State-B' as illustrated by a transition arrow 222; and responsive to Event-II, denoted as event 234, the master state-machine switches from 'State-B' to 'State-C' as illustrated by a transition arrow 224; and responsive to Event-III, denoted as event 236, the master state-machine switches from 'State-C' to 'State-D' as illustrated by a transition arrow 236; and responsive to Event-IV, denoted as event 238, the master state-machine switches from 'State D' back to 'State-A' as illustrated by a transition arrow 228.

Diagram 240 illustrates two auxiliary states and transitions of an auxiliary state-machine responsive to an auxiliary signal akin to auxiliary signal 128 that corresponds or is effectively equivalent to the same events, that is, to Event-I, Event-II, Event-III and Event-IV. Thus, for simplification, a logic circuitry akin to logic circuitry 142 generates an auxiliary signal that does not depend on a state of the master state-machine, such as redirecting an event to the auxiliary signal.

The auxiliary states are represented by a 'Black' color, denoted as an auxiliary state 242, and 'White' color, denoted as an auxiliary state 244.

Thus, responsive to Event-I or Event-III, 'Black' color switches to 'White' color as illustrated by a transition arrow 246, and responsive to Event-II or Event-IV 'White' color swishes to 'Black' color as illustrated by a transition arrow 248.

Accordingly, 'State-A' and 'State-C' correspond to 'Black' color in a two-to-one correspondence, and "State-B' and 'State-D' correspond to 'White' color in a two-to-one correspondence.

According to diagram 210 and diagram 240 and with reference to organization 100, when condition (1) and condition (2) below are valid, no tapering of the master clock is identified or indicated; otherwise, in case either condition (1) or condition (2) do not hold, tampering or disruption of the master clock is indicated and may be identified.

$$(\text{Color}==\text{'Black'}) \&\& ((\text{master state}==\text{'State-}A\text{'}) || \\ (\text{master state}==\text{'State-}C\text{'})) \quad (1)$$

$$(\text{Color}==\text{'White'}) \&\& ((\text{master state}==\text{'State-}B\text{'}) || \\ (\text{master state}==\text{'State-}D\text{'})) \quad (2)$$

The conditions above are formulated according to the C programming language.

Evidently, at least 2 bits are needed to represent the four master states, and at least one bit is needed to represent the two auxiliary states (akin to parity).

In comparison to a correspondence of a plurality of transitions and master states of the master state-machine with two colors as exemplified above, in some embodiments the auxiliary state-machine is configured and/or constructed such that for each transition of the master state-machine the auxiliary state-machine switches to a different unique color, thus establishing a correspondence between the master states and the auxiliary states.

In some embodiments, as noted above, intermediary correspondence between the master states and colors occur, for example, 6 master states may correspond to 3 colors.

There is thus provided according to the present disclosure an apparatus for detecting tampering with a clock of a state-machine, comprising, a master state-machine having master states and driven by a master clock, the master states being switchable responsive to events, and an auxiliary state-machine having auxiliary states and driven by an auxiliary clock synchronous with the master clock, the auxiliary states being switchable responsive to a signal generated based at least on said events, consequently establishing a correspondence between the master states and the auxiliary states, thus ensuing that subsequent to tampering with the master clock the correspondence between the master states and the auxiliary states become discordant, thereby indicating that the master clock has been tampered with.

In some embodiments, the correspondence between the master states and the auxiliary states become discordant since subsequent to tampering with the master clock the correspondence between the master states and the auxiliary states are eventually violated.

In some embodiments, the apparatus further comprises a validation circuitry configured to detect the discordant correspondence between the master states and the auxiliary states.

In some embodiments, the validation circuitry is configured to activate an action responsive to detecting the discordant correspondence between the master states and the auxiliary states.

In some embodiments, the action comprises a perceptible alert.

In some embodiments, the action comprises affecting the master state-machine.

In some embodiments, the apparatus further comprises a plurality of auxiliary state-machines thus increasing reliability of detecting tampering with the master clock in case an auxiliary clock is tampered with.

As used herein the term 'configuring' and/or 'adapting' for an objective, or a variation thereof, implies using components in a manner and/or mechanism designed for achieving the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A electronic apparatus for detecting tampering with a clock of an electronically implemented state-machine, comprising:
   an electronically implemented state-machine as a master state-machine having master states and driven by a master clock, the master states being switchable responsive to events; and
   an electronically implemented state-machine as an auxiliary state-machine having auxiliary states and driven by an auxiliary clock synchronous with the master clock, the auxiliary states being switchable responsive to a signal generated based at least on said events, consequently establishing a correspondence between the master states and the auxiliary states, thus ensuing that subsequent to tampering with the master clock the correspondence between the master states and the auxiliary states become discordant, thereby indicating that the master clock has been tampered with.

2. The apparatus according to claim 1, wherein the correspondence between the master states and the auxiliary states become discordant since subsequent to tampering with the master clock the correspondence between the master states and the auxiliary states are eventually violated.

3. The apparatus according to claim 1, further comprising a validation circuitry configured to detect the discordant correspondence between the master states and the auxiliary states.

4. The apparatus according to claim 3, wherein the validation circuitry is configured to activate an action responsive to detecting the discordant correspondence between the master states and the auxiliary states.

5. The apparatus according to claim 4, wherein the action comprises a perceptible alert.

6. The apparatus according to claim 4, wherein the action comprises affecting the master state-machine.

7. The apparatus according to claim 1, further comprising redundant auxiliary state-machines thus, due to the redundancy of the auxiliary state-machines, increasing reliability of detecting tampering with the master clock in case an auxiliary clock is tampered with relative to reliability of detection without redundant auxiliary state-machines.

* * * * *